United States Patent [19]
Bechtel et al.

[11] Patent Number: 5,666,028
[45] Date of Patent: Sep. 9, 1997

[54] AUTOMOBILE HEADLAMP AND RUNNING LIGHT CONTROL SYSTEM

[75] Inventors: Jon H. Bechtel; David J. Schmidt, both of Holland; Robert C. Knapp, Coloma, all of Mich.

[73] Assignee: Gentex Corporation, Zeeland, Mich.

[21] Appl. No.: 223,972

[22] Filed: Apr. 6, 1994

[51] Int. Cl.$^6$ ................. G02F 1/17; H05B 39/00
[52] U.S. Cl. .............. 315/82; 307/10.8; 359/601; 359/604; 315/149; 315/159
[58] Field of Search ............... 315/82, 149, 159; 359/601, 603, 604, 611, 613, 614; 307/9.1, 10.1, 10.8; 250/214 AL, 214 D

[56] References Cited

U.S. PATENT DOCUMENTS

| | | | |
|---|---|---|---|
| 2,912,593 | 11/1959 | Deuth | 359/604 X |
| 4,015,137 | 3/1977 | Kniesly et al. | 315/82 X |
| 4,376,909 | 3/1983 | Tagami et al. | 315/82 |
| 4,793,690 | 12/1988 | Gahan et al. | 250/214 D X |
| 5,204,778 | 4/1993 | Bechtel | 359/604 |
| 5,451,822 | 9/1995 | Bechtel et al. | 315/82 X |

*Primary Examiner*—Robert Pascal
*Assistant Examiner*—Arnold Kinkead
*Attorney, Agent, or Firm*—Malcolm R. McKinnon

[57] ABSTRACT

An automobile headlamp and running light control system for controlling an operating state of automobile headlamps and tail/marker lamps, and determining an operating threshold for an automatic dimming rearview mirror system. The headlamp and running light control system including an ambient light sensing arrangement having an ambient light sensor which determines a present ambient light level in a vicinity of the vehicle, a first control arrangement for selecting an operating state of the vehicle lamps in accordance with an output of the ambient light sensor, a second control arrangement for determining the operating threshold of the automatic dimming rearview mirror system in accordance with the output of the ambient light sensor, and a lamp switching arrangement which activates and deactivates the vehicle lamps in response to the first control arrangement.

9 Claims, 5 Drawing Sheets

AUTOMOBILE HEADLAMP AND RUNNING LIGHT CONTROL SYSTEM

FIELD OF THE INVENTION

The purpose of this invention is to provide an improved headlamp and running light control system for automotive vehicular use. A particular objective is to utilize an ambient light sensor to at least in part determine whether to turn the headlamps off or on, the sensor also being used to at least in part determine the operating threshold of an automatic dimming rearview mirror system. Other objectives and features will become apparent in the description. The economies of sharing resources, particularly of sharing the ambient light sensing function should make it possible to provide both the headlamp and the mirror control functions at a cost which is substantially below that for an equivalent system for which the resources are provided independently.

The circuit with minor modifications may be used as a headlamp on/off control where running lights are not provided. Also while a vehicle which is equipped with daytime running lamps is in operation, if the headlamps are off, the daytime running lamps are normally on. Thus, when it is stated that the headlamps are off or are turned off and the vehicle is still in operation, it is normally assumed that the daytime running lamps are turned on.

BACKGROUND OF THE INVENTION

A rearview mirror which combines the headlamp on/off control and the rearview mirror control functions is in commercial use. The only such system which is known to the inventors is manufactured by the assignee of this invention and is also the subject of a copending patent application Ser. No. 07/670,258, filed March 15, 1991, which is also assigned to the assignee of this invention. The commercial system utilizes a single microcontroller for the combined mirror and headlamp control functions but uses completely separate sensors for the mirror control and the headlamp control functions.

Mirror control circuits of the type utilized in an embodiment of this invention are generally described in U.S. Pat. No. 5,204,778 which is included herein by reference.

It was noted above that the conventional combined headlamp and mirror control did not utilize a common sensor for the headlamp and the mirror control functions. There were several reasons for this. First, it was commonly believed that satisfactory performance for the headlamp control function required the sensor to view skyward and that the sensor for the mirror control needed to view forwardly with the view in the skyward direction blocked. The conventional headlamp and running light controls have normally utilized a sensor which views upward and which covers a relatively wide viewing angle. In what follows, the term "sensor's field of view" refers to the total viewing region for which the sensor has substantial sensitivity to light rays emanating therefrom. The sensor for the headlamp control has traditionally been mounted under the dash of the vehicle so as to view skyward through a grille in the dash and through the windshield. The combined headlamp control and automatic mirror with the separate sensors referred to above incorporates a sensor which is mounted to view upward through the windshield at a position just below and in front of the button which is used to mount the mirror to the vehicle's windshield. The automatic mirrors, on the other hand, have normally used an ambient light sensor which views forwardly with some type of visor to intentionally limit the maximum elevational angle of the sensor's field of view.

Two common restrictions for the mirror ambient light sensor have been to restrict the sensor's field of view to approximately that which the driver sees and to also to limit the elevational angle of the sensor's field of view so as to prevent undue response to light from street lamps which are nearly overhead. When seated in a normal position, the upper extent of a tall driver's elevational field of view through the windshield below the tinted shade band may be as small as 5 degrees from the horizontal. For typical drivers seated in a normal driving position the upper extent of their elevational field of view is less that 30 degrees from the horizontal for many vehicles. For the combined mirror and headlamp control function, it is desirable to violate the requirement to view generally the field of view which the driver sees (Here it is assumed that this is the view seen when the driver is sitting in a normal position and not when crouching and or leaning forward.) In the preferred embodiment, the elevational field of view is extended up to an elevational angle of sixty degrees above the horizontal when it is possible to do so with the available sensor mounting positions. This brings up an additional problem. The tinted shade band used across the top of many windshields blocks a high enough percentage of the light coming through it to effectively block the sensor's field of view through it. The ambient light sensors in many present day automatic rearview mirrors are mounted where their greatest elevational viewing angle is effectively limited to 30 to 45 degrees by the tinted shade band of the windshield. For the combined sensor application, several features should be used either singly or in combination to enlarge the sensor's field of view. First, the aperture in the case for the ambient light sensor should be assigned for fairly minimal restriction on the sensor's field of view. This includes making the forward field of view laterally wide as possible and extending the elevational angle of the field of view to approximately 60 degrees above the horizontal. Second, a lens may be used to facilitate the enlargement of the field of view. Third, the sensor should be placed low on the mirror case and preferably toward the driver's side which is angled toward the windshield so that it will be as far down and as far forward as possible to maximize the elevational field of view as limited by the tinted shade band of the windshield or possibly by the top of the windshield if a deeply tinted shade band is not used. An alternative is to place the sensor very close to the windshield in the proximity of the mounting button of the mirror and to provide the view indicated above. As indicated, it is desirable to use a much wider field of view than has been the practice of the mirror ambient light sensing function and only to shade the sensor from light which comes from almost directly overhead to minimize the effect of street lamps which are nearly overhead on the mirror control function but to include an elevational viewing angle of up to sixty degrees or so above the horizontal and toward the front of the vehicle.

To use the sensor for the combined application, a field of view for the sensor which represents a best compromise for the available mounting position and for performance for the mirror and for the headlamp and running light control should be used. There are also technical advantages with the mirror control to make the sensor's total field of view as large as possible perhaps short of being sensitive to the direct light from streetlights which are almost directly overhead. It is advantageous to use a very large field of view for the headlamp and running light control function. Thus, the sensor position and aperture should be chosen to generally increase the sensor's field of view over that which has traditionally been used for the mirror control application. To accommodate the mirror control function, the sensor should be directed to view in a generally forward direction, preferably angling it slightly upward from the horizontal viewing direction to generally center the viewing aperture of the light sensor with desired field of view as just defined.

A second factor preventing the shared use of an ambient light sensor for the headlamp and running light and mirror ambient light sensing functions is the very large light range that must be sensed for the combined functions and the need to simultaneously supply a signal from the sensor to each of the control circuits. The range of ambient light levels for which actual light levels need to be read and for which the magnitude of these readings directly effect the response of the mirror typically span the range from roughly 0.1 lux to 50 lux. This is already a large dynamic range of five hundred to one. The light levels which are used to determine when to turn the headlamps on or off normally fall in the range of 100 to 1000 lux. Thus, the use of a single sensor to serve both functions satisfactorily requires a substantially larger dynamic range. This range must be provided inexpensively and performance must be satisfactory over the entire automotive temperature and humidity range. The circuit must also continue to perform properly in the presence of very high levels of radio frequency emissions such as those created by relatively powerful mobile communications or mobile ham radio transmitters whose transmitting antennas may be placed in close proximity to the control module. With these obstacles, it requires an inventive circuit configuration to obtain satisfactory circuit performance without the use of separate sensors for the mirror ambient light and the headlamp ambient light sensing functions. Analog-based mirror circuits other than the one of U.S. Pat. No. 5,204,778 have typically biased the ambient light sensor in ways that would provide a sensor signal level of well under 100 millivolts at light levels at which the headlamp Circuit switching thresholds are placed. The mirror control circuits some embodiments of U.S. Pat. No. 5,204,778 provide unusually high sensor voltages at the higher light levels at which the headlamps are turned on and off. The voltage at the ambient light sensor for the circuit of FIG. 2 of U.S. Pat. No. 5,204,778 is in the range of several tenths of a volt to a little over a volt at the threshold light levels for which the headlamps are turned on and off. This is much higher than the level available from the sensor configuration of other circuits and this discovery was the first step leading to the device of the preferred embodiment.

Several additional improvements over prior art devices are needed to provide good performance with the combined sensor configuration. It is important to turn the headlamps of a vehicle on when they are required and off when they are not required but at the same time to not cycle too frequently between on and off states so as to confuse drivers or pedestrians in the vicinity of the vehicle or to annoy occupants of the vehicle or to wear out the vehicle's headlamp switching mechanism. As will be explained later in more detail, the preferred circuit incorporates hysteresis whereby the ambient light level is first compared against one of two thresholds, the higher threshold corresponding to a light level which is generally in the range of 40 to 100 percent higher than the lower threshold. When the sensor reading indicates that the headlamps should be on, the ambient light level must rise above the higher threshold for the circuit to indicate that they should be turned off. When the sensor reading indicates that the headlamps should be off, the ambient light level must fall below the lower threshold for the circuit to indicate that they should be turned on. The feature just described is also incorporated in one form or another in prior art devices.

Light levels can be so erratic due to things such as varying cloud cover, buildings or trees blocking light, or changes in direction of travel that even the hysteresis used to create the dual thresholds just described is not enough to assure reasonably stable switching of the headlamps. An additional feature used by present day analog headlamp and running light control circuits has been to combine a time average with the hysteresis circuit to effectively add a delay to the headlamp switching function so that the headlight switching is delayed by a period generally ranging from five to fifty seconds after the sensed ambient light level has changed to indicate that the alternate state should be assumed. Such arrangements did lead to improved performance, but circuits which utilize them still tend to switch the headlamps on and off too frequently when there are frequent changes in the ambient light level as is, for example, caused by intermittent shadowing of clouds or by numerous overpasses. Furthermore, some compromise is involved in positioning an ambient light sensor to serve both the mirror and headlamp and running light function so this problem is exacerbated. Some microcontroller based devices such as the one of the copending application Ser. No. 07/670,258 have used more sophisticated timing arrangements but no prior art analog circuit based headlamp controls with timing features of the type used in the preferred circuit are known to the inventors. As will be explained in detail later, the preferred device of this invention utilizes a circuit feature which favors and thereby tends to keep the headlamps in their present state under fluctuating ambient light conditions.

Many presently used analog circuit based headlamp controls which are known to the inventors and which have a headlamp delay feature to keep the headlamps on for a predetermined period after the ignition is turned off continue to draw several milliamps all of the time even after the headlamps are turned off. Such controls are allowed only because they were designed before more stringent quiescent current consumption requirements were instituted to limit total quiescent current consumption. New designs must meet the more stringent current consumption requirements which are necessitated by the greatly increased number of electronic devices in today's vehicles. The analog based controls are potentially less expensive than digital ones, but need to either have extremely low quiescent current consumption or to de-energize themselves when both the ignition switch and the headlamps are off. When the units shut themselves down, an additional problem is encountered in that there must not be spurious switching of the headlamps either when the unit de-energizes itself or when the unit is re-energized when the ignition switch is turned on. Furthermore, when the ignition is turned on, the headlamps must not be energized unless the ambient light level indicates that they are needed and if the ambient light level does indicate that they are needed, they must be energized within a short time which should not exceed three to five seconds. When the headlamps are needed, it is preferable to delay the headlamp turn on for one to two seconds after the ignition is turned on. The driver normally turns the ignition key directly to the "start" position and holds it there until the engine starts. Under the stated conditions, since the headlamps are not normally energized with the ignition in the "start" position, the short delay prevents the headlamps from coming on to full brightness until after the vehicle is started.

Thus, one objective of the present invention is to provide a headlamp and running light control which uses an ambient light sensor which provides a signal which is used both to at least partially determine whether turn the headlamps on or off and to at least partially determine the operating sensitivity of an automatic rearview mirror.

Another objective of the present invention is to provide an analog based headlamp and running light control in which a time delay period is used to delay switching from one headlamp state to the other with control of the delay period characterized in that a substantially shorter time is required to increase the delay period by a given delay increment toward its maximum period than is required to expend the given delay increment in the direction toward switching the state of the headlamps. The increase in the delay period toward its maximum takes place when the desired headlamp condition as indicated by the sensed ambient light level agrees, or is consistent with the present state of the headlamps and the delay period is expended when the desired headlamp condition as indicated by the sensed ambient light level disagrees, or is inconsistent with the present state of the headlamps.

Another objective of the present invention is to provide an analog based headlamp control for which, under rapidly fluctuating ambient light conditions, the desired state of the headlamps as indicated by the sensed ambient light level needs to agree with the present headlamp state for only a relatively small percentage of the time to cause the headlamps to remain in that state. This small percentage is preferably five percent to twenty percent of the time but may be chosen in the range of zero percent to forty percent. The greatest advantage is gained by choosing a small percentage which is greater than zero so that frequent flashes of bright light cannot hold the headlamps off, or frequent very short periods of deep shadowing cannot hold them on.

Another objective of the present invention is to provide an analog based control which provides a headlamp exit delay feature and which de-energizes its own circuits when or after the headlamps are turned off and which then reinitializes itself when the ignition is turned on again to power up with the headlamps off but to turn them on within an acceptable short period of time when they are required. An additional optional objective is to supply the power to maintain operation of the circuit during the exit delay period and to signal the NIGHT mode or headlamp on condition using a single switching means. An additional optional objective is to use a single timing means to effect proper initialization of the headlamps when the ignition switch is turned on and to perform the timing function for the exit delay function.

An additional objective of the present invention is to perform the complex combination of timing initialization and power conservation functions of the headlamp control in an analog implementation which utilizes analog circuit technologies similar to those of the mirror control circuit of U.S. Pat. No. 5,204,778. By so doing, large portions of the circuit functions for both the mirror and the headlamp control features can ultimately be implemented in a single integrated circuit which will give a substantially more economical solution for many applications than a microcontroller based design. The array of features referred to above is not easy to implement in an economical analog device.

Another objective of an alternate embodiment of this invention is to use a common ambient light sensor for control of an automatic rearview mirror and for sensing light levels in the proper range for the headlamp and running light function whereby the ambient light level signal is changed to a digital indication and transmitted over a communication bus to a microcontroller based unit which uses the transmitted ambient light indication to at least partially determine the state to which to switch the headlamps.

A further objective of an alternate embodiment of the present invention is to share use of an ambient light sensor at least between the mirror and the headlamp control functions and to incorporate a microcontroller for a portion of the control function.

A further objective of the present invention is to provide a separate ambient light sensor and circuit module which may be mounted in the vicinity of or integrally with the rearview mirror and which senses the ambient light and generates a control signal to turn the headlamps on and off as a function of the signal from the ambient light sensor, the module serving as an alternate to the combined headlamp and mirror control module and characterized in that it may be used interchangeably with the mirror and headlamp control module so that different wiring or different headlamp switching modules are not required for the separate mirror options. It is anticipated that this module would normally be used in combination with a conventional prism type rearview mirror when the automatic mirror is not provided.

A further objective of the present invention is to provide an ambient light sensor for the combined headlamp and running light and mirror control functions which has a field of view to the front of the vehicle which is substantially larger than that seen by the driver.

Another objective of the present invention is to provide a sensor and associated control circuits for which the mirror control function primarily utilizes the ambient sensor circuit's current versus light level characteristic to perform its control function and the headlamp and running light control primarily utilizes the ambient light sensors circuit's voltages versus light level characteristic to perform its control function.

BRIEF DESCRIPTION OF THE DRAWINGS

FIG. 4 is a block diagram indicating use of an ambient light sensor with a vehicle which has a communication bus.

DETAILED DESCRIPTION

Figure 5:
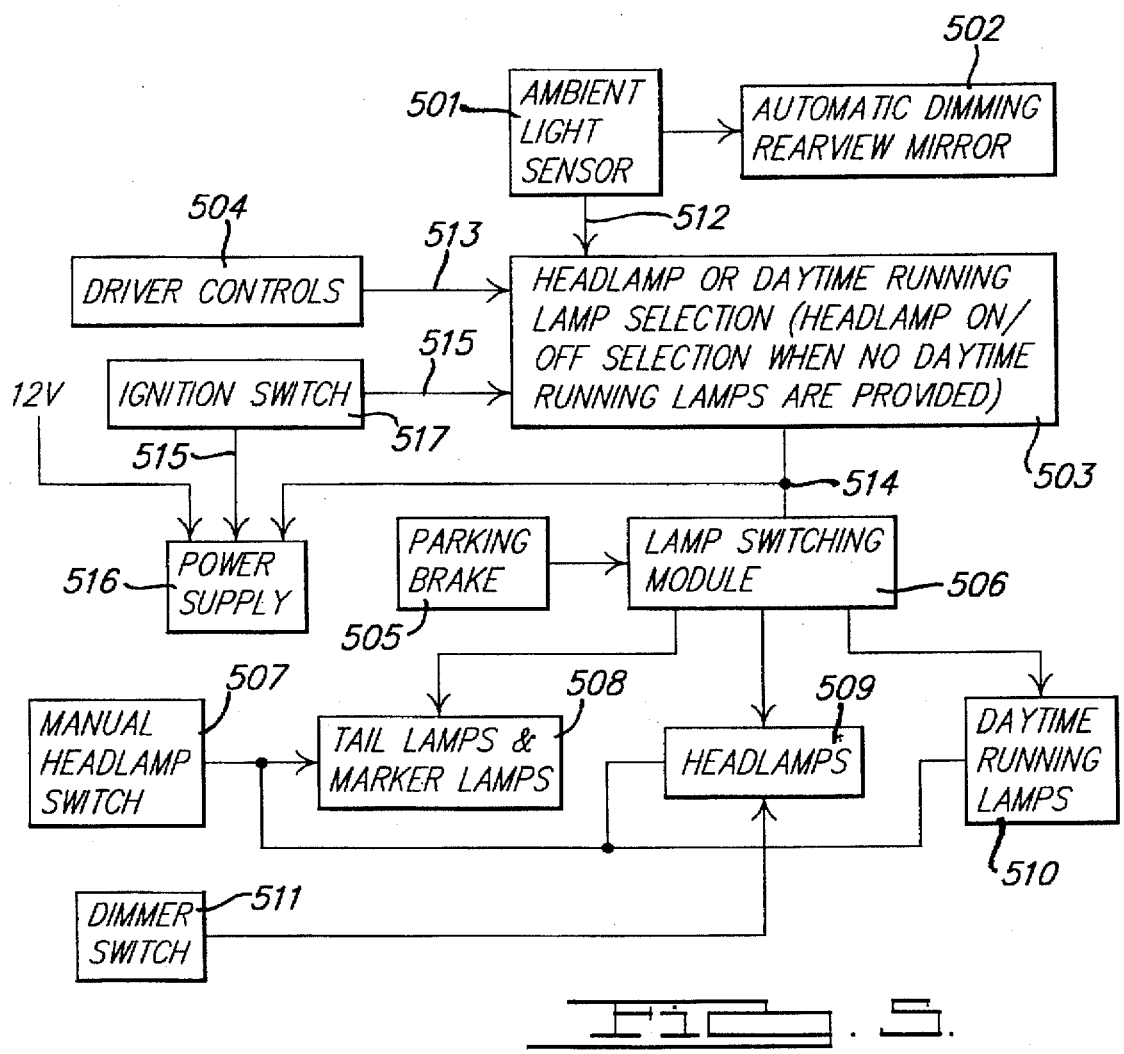
FIG. 5 is a block diagram of the overall control system incorporating an embodiment of this invention.

FIG. 5 is an overall block diagram which includes the device of this invention. The power supply 516 receives several inputs one from the 12 volt input which is supplied continuously, another from the 12 volt input which is switched by the ignition switch 517, and another from a control signal 514 which signals when the headlamps are to be turned on. The power supply 516 provides power as required to other blocks in the block diagram. For simplicity these interconnections are not shown. The ambient light sensor 501 outputs signals indicative of the ambient light level to both the mirror control circuit 502 and to the headlamp or daytime running lamp selection circuit 503. If the daytime running lamps are not provided, the function of block 503 does not change but the headlamp switching circuit responds to a signal to turn the headlamps off by turning all lights off rather than by turning the headlamps off and the running lights (or daytime running lamps) on. For normal driving operation, the headlamp on condition refers to having the headlamps energized to full brightness in either the high or low beam state for nighttime or for low ambient light level driving conditions and headlamps off implies that the headlamps are off or that the daytime running lights are on when they are provided. The daytime running light feature is frequently implemented by energizing either the high or the low beams of the vehicle's headlamps at a reduced power level. The headlamp control circuit 503 optionally includes driver adjustable inputs such as a knob or slider 507 and 511 to adjust the exit delay time as provided in the preferred embodiment. The exit delay is a period of time during which the headlamps, when they are on, remain on to provide light while the driver and passengers leave the vehicle. Other controls such as a switch to defeat the automatic headlamp control function may also be provided. Block 503 is shown in detail in FIG. 6 and its implementation is shown in the circuit diagram of FIG. 1.

The block 503 outputs a signal 514 which indicates when the headlamps should be on. In the preferred embodiment, this signal is also used to supply power to the circuit to keep it energized during the exit delay period. When the signal at 514 goes low to signal turn off of the headlamps at the end of the exit delay period it also accomplishes the dual purpose of de-energizing the circuit of block 503 so that it does not continue to consume a significant amount of power while the vehicle is idle, the headlamps are off, and the ignition is turned off.

Figure 6:
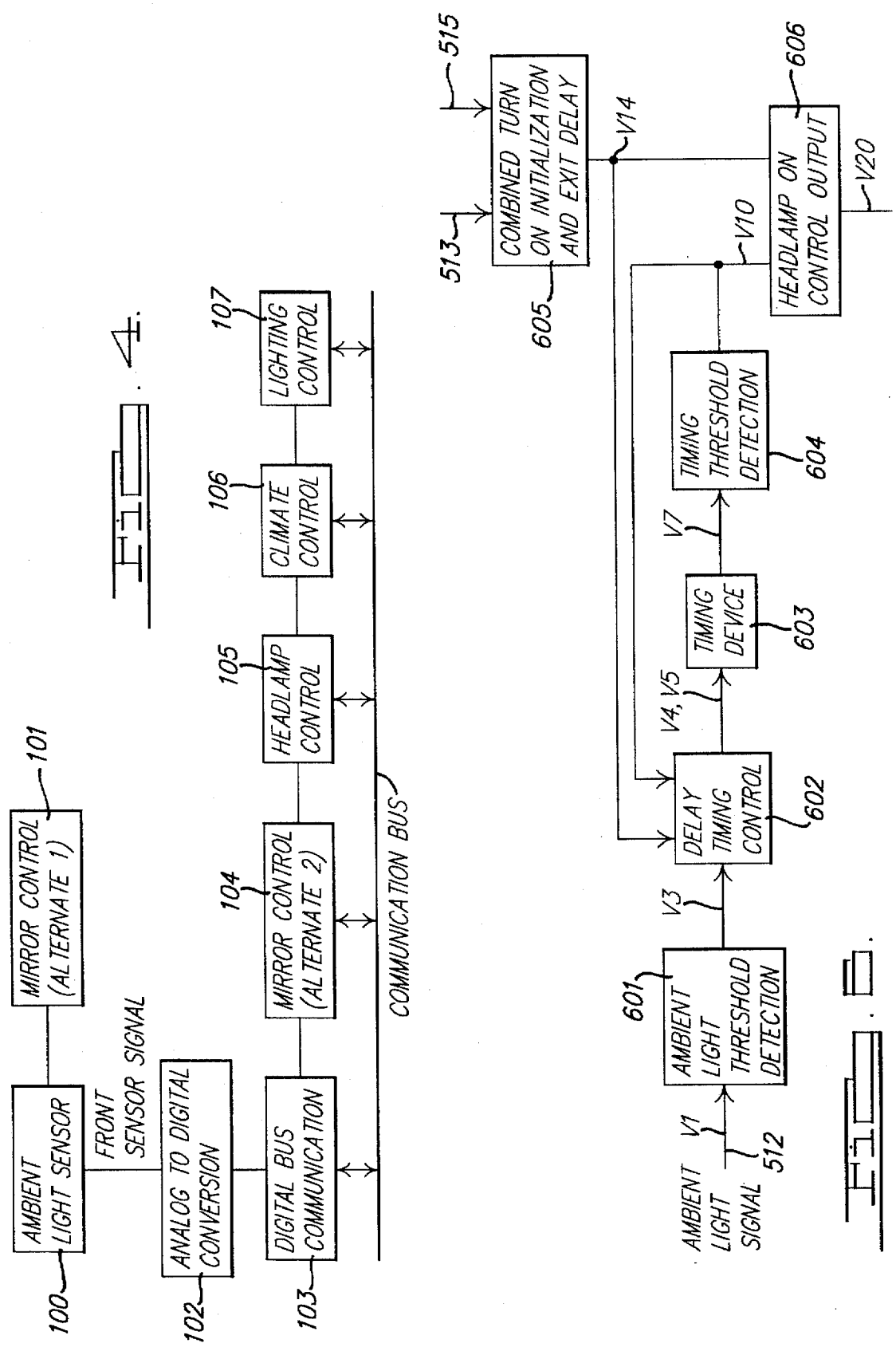
FIG. 6 is a block diagram which details the function of the circuit of FIG. 1.

FIG. 6 is a more detailed block diagram of the headlamp or daytime running lamp selection block 503 of FIG. 5. The circuit functions of FIG. 1 which generally correspond to the blocks of FIG. 6 are enclosed by dashed lines which have corresponding numerical designations. The voltages labeled in FIG. 1 which are primarily responsible for communicating the signals between blocks are indicated by like labels on the lines which interconnect the blocks in FIG. 6.

The signal V1 at 512 in FIG. 6, which indicates the ambient light level, is first processed in the ambient light threshold detection block 601. Various filtering or other detection algorithms may be applied at this point. In the preferred circuit, a threshold detection with hysteresis is employed. The signal V3 assumes a first level to indicate a high ambient light condition for which the headlamps should ultimately be switched to the "off" or daytime running lamp configuration, and a second level to indicate a low ambient light condition for which the headlamps should ultimately be switched on. The signal V3 is an input to the timing control 602. The timing control also receives an input V10 which is fed back from the timing threshold detection block 604. The signal under normal driving conditions directly determines the state of output V20 from block 606 of FIG. 6 (This corresponds to the output on the NIGHT terminal of FIG. 1.). The signal V20 in turn directly controls the on state of the headlamps when they are under the automatic control of the headlamp control circuit and when no special conditions inhibit their turn on. Thus, for normal driving operation V10 may be considered to indicate the present state of the headlamps while V3 indicates the headlamp state called for by the present ambient light condition. Because of the delay built into the circuit, these two indications do not always agree and there are four possible combinations of inputs from V3 which is indicative of the present ambient light condition and V10 which is indicative of the present headlamp control state. The circuit of the delay timing control block 603 is configured to distinguish the four combinations of V3 and V10 and to control the timing circuit according to which of the four combinations is present.

For two of the four combinations either the ambient light condition indicated by V3 is high and the headlamp control state as indicated by V10 is for headlamps off (daytime running lamp on), or else the ambient light condition indicated by V3 is low and the headlamp control state as indicated by V10 is for headlamps on. These are the two combinations for which the present ambient light condition agrees with the present headlamp control state. With the preferred arrangement, the response for each of these two combinations of agreement of the present and indicated headlamp states is to increase the delay required to switch to the alternate headlamp state at a rate which is generally faster than the time required to expend the delay toward the timing threshold at which the headlamps are switched to their alternate state. Switching of the headlamps to their alternate state takes place during the other two input combinations when the ambient light condition disagrees with the headlamp control state. Switching of the headlamps to their alternate state occurs after the required delay referred to above is expended. The required delay referred to above is only increased to a maximum value and is then maintained at that maximum value rather than being further increased.

For the other two of the four combinations either the ambient light condition indicated by V3 is high and the headlamp control state as indicated by V10 is for headlamps on, or else the ambient light condition indicated by V3 is low and the headlamp control state as indicated by V10 is for headlamps off (daytime running lamp on). These are the two combinations for which the present ambient light condition disagrees with the present headlamp control state. With the preferred arrangement, the response for each of these two combinations is to expend the remaining delay toward the threshold at which the headlamps are switched to their alternate state at a rate which is generally slower than the time required to increase the corresponding required delay toward the condition of maximum delay when the ambient light condition agrees with the headlamp control state.

The preferred circuit has flexibility for the circuit designer to establish the maximum delay for headlamp turn on, the maximum delay for headlamp turn off, the rate at which the delay for turn on is increased toward its maximum, and the rate at which the delay for turn off is increased toward its maximum. With only a few practical circuit limitations, these four parameters may be independently selected and circuit component values may be chosen to implement the specified timings. Furthermore beyond the two general requirements stated earlier, the maximum delay required for the headlamps to turn off is normally made longer that the maximum delay for the headlamps to turn on.

The timing device 603 of the preferred circuit consists of a capacitor and operational amplifier configured in an integrating configuration with the input resistance network being configured by the delay timing control of block 602. While the circuit is de-energized with the ignition turned off and the headlamps off, the timing capacitor discharges to a state which results in the circuit powering up with the headlamps off the next time the ignition is turned on.

The timing threshold detection circuit inputs the voltage V7 which indicates the state of the timing capacitor and utilizes hysteresis to switch to the alternate state at each of the two time-out thresholds. The output V10 is the signal which determines when to turn on the headlamps when there are no overriding conditions.

Block 605 serves the dual purpose to initiate proper startup and initialization of the circuit when the ignition switch is turned on to the "run" or "start" positions and to control the exit delay period when the ignition switch is turned to the "off" position. The preferred circuit for block 605 utilizes a timing capacitor which discharges when the ignition is in the "off" position. When, after a substantial period with the ignition turned "off" the ignition is turned to the "run" or "start" positions, the circuit receives power from circuit 516 of FIG. 5 and V14 is switched to indicate that the headlamps should be turned off and that the delay timing control 602 should rapidly slew the timing capacitor to the headlamp on state when and only when the signal V3 from the ambient light threshold detection circuit indicates a low ambient light condition. With the ignition in the "run" or "start" positions, the timing capacitor of block 605 is rapidly charged so that after a second or so the signal at V14 is switched to its normal state for which the headlamp state indicated by V20 is allowed to follow the headlamp state indicated by V10 and the delay timing control block 602 is no longer configured to quickly slew the timing capacitor to the headlamp on condition when the ambient light level is low. With the operation described, the circuit does not needlessly start out with the headlamps on in their normal full bright condition, yet they are turned on within a very few seconds when low ambient light conditions require their use.

When the ignition switch is turned to the "off" position, if V10 is not calling for headlamps on neither is V20 and the circuit supply is immediately turned off so the lights are all turned off immediately. When V10 and thus V20 call for the headlamps to be on when the ignition switch is turned to the "off" position, V20 maintains the power supply to the circuit as well as holding the headlamps on but the timing capacitor in the exit delay circuit 605 discharges at a rate determined by the driver's exit delay setting at 513. When the exit delay time-out occurs, V14 switches to its alternate state. In response to the change of the signal on V14, V20 switches to the headlamp off state which also de-energizes the circuit. With the circuit de-energized, the momentary input from V14 to the fast initialization feature of block 602 has no significant effect on circuit operation.

AMBIENT LIGHT SENSOR

Figure 7:
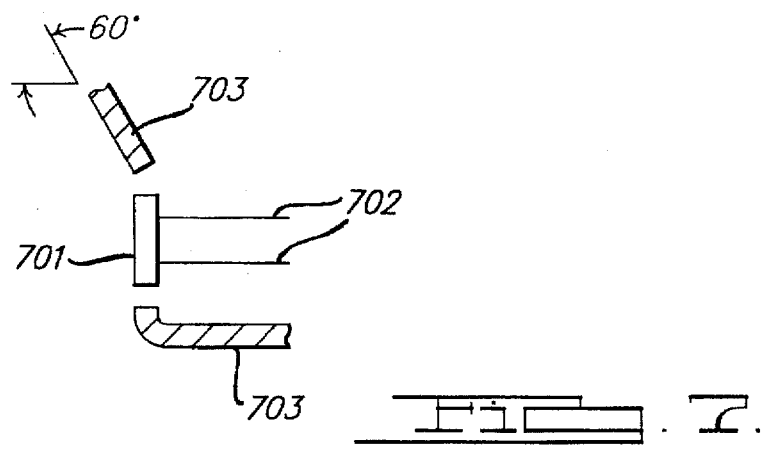
FIG. 7 is a simplified diagram showing a side view of the mounting of the ambient light sensor in a mirror case.

FIG. 7 depicts a side view of the aperture in the mirror case for a typical mounting of the ambient light sensor configured to be used both for the mirror and the headlamp control ambient light sensing functions. The mirror case 703 around the sensor opening is depicted in fragmentary cross sectioned view. The sensor 701 is depicted with leads 702 which are connected in the circuit as shown by R243 of FIG. 1. The sensor is extended nearly to the opening in the case and a clear elevational view extending to an elevation of preferably at least sixty degrees from the horizontal is provided. The sensor is preferably mounted well toward the front of and toward the lower driver's side corner of the mirror case so that the sensor's position is as low and far forward as possible so that the elevational viewing angle past the tinted shade band on the windshield can be maintained. A means to protect the sensor and its associated circuit from the damaging effects of electrostatic discharge is not shown. Any of a number of methods may be used. A few examples are given. A photocell with a metal case which is grounded may be employed. A grounded conduction ring may be mounted around the periphery of the photocell. Insulating windows may be used as portions of the protection means.

CIRCUIT DESCRIPTION

Figure 1:
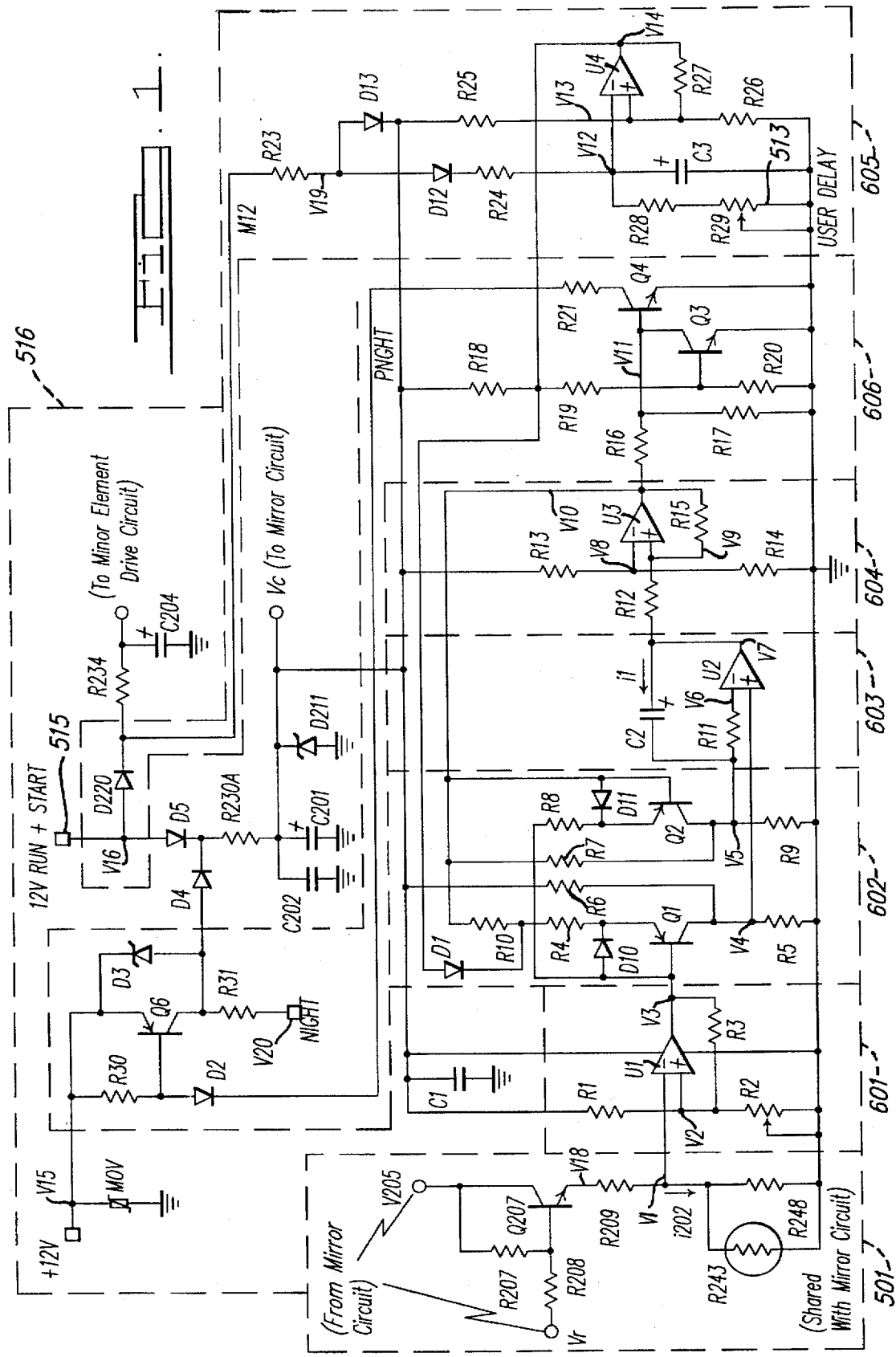
FIG. 1 is a circuit diagram of the portion of the headlamp control circuit which normally shares the ambient light sensor and portions of the power supply with the rearview mirror control and which is normally packaged in the rearview mirror along with the mirror control circuit.

The circuit depicted in FIG. 1 is the portion of the headlamp and running light control circuit which is normally placed in the housing of the rearview mirror of the vehicle. Portions of the circuit which are also part of the mirror circuit of FIG. 2 of U.S. Pat. No. 5,204,778 are designated in FIG. 1 herein by corresponding numbers to which 200 has been added. The value of resistor R230A has been decreased to provide added supply current for the circuitry of FIG. 1 which is used with the mirror control circuit just referenced. The circuit receives power from the automotive supply through two inputs. The +12 V input continuously supplies a nominal 12 volts at V15 and the 12 V RUN+START input supplies a nominal 12 volts when the ignition switch is turned to the "run" or the "start" positions but not when it is turned to the "off" position. The circuit is also connected to the automotive ground and to a terminal NIGHT which it pulls high when the headlamps are required. The NIGHT signal connects to a separate module which is normally mounted under the dash of the vehicle and which responds to the NIGHT signal to turn on the headlamps when they are needed. The circuit has a driver adjustable exit delay feature which the driver adjusts to keep the headlamps on in low ambient light conditions the period of time set by the driver after the ignition switch is turned to the "off" position. This provides illumination for the driver and passengers to leave the vehicle. The circuit switches its own power off at the same time that it turns off the NIGHT signal to signal the control module of FIG. 2 to turn off the headlamps. This is done to prevent the circuit from drawing a substantial amount of current when the vehicle is not in use and the headlamps are not being controlled.

Figure 8:
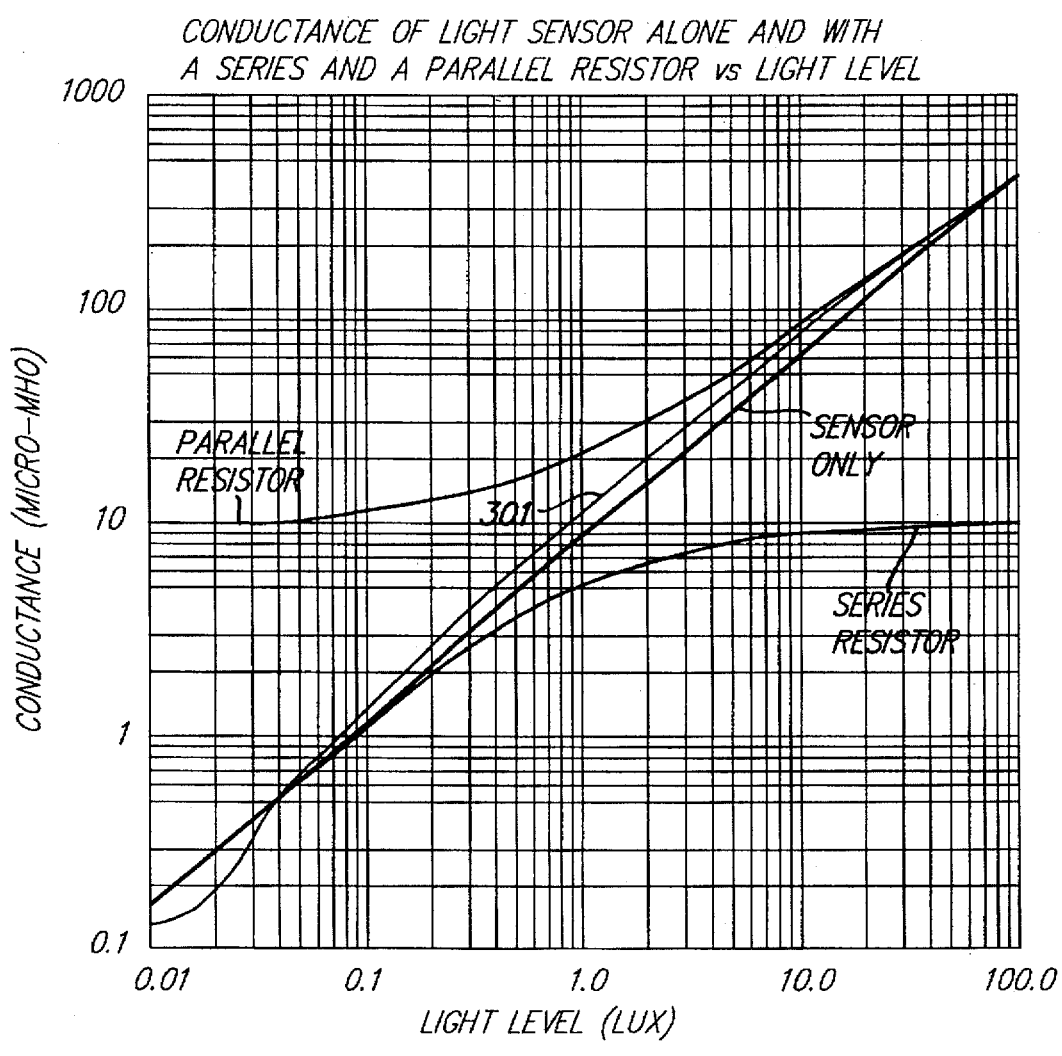
FIG. 8 illustrates plots of conductance of a light sensor alone and of a light sensor with a parallel resistor and of a light sensor with a series resistor versus the light level.

Power is supplied at V16 when the ignition is in the "start" or "run" positions and transistor Q6 and its associated circuit serve to keep the circuit energized from V15 during the exit delay period after the ignition is turned off. The cadmium sulfide photo-sensitive resistor R243 is one which has the general conductance verses light level characteristic shown in curve 301 of FIG. 8. Curve 301 depicts the conductance versus light level for light levels up to 100 lux. This conductance versus light level curve extrapolates smoothly into the 100 lux to 1000 lux range where the headlamp and running light control switching thresholds are normally placed. At 500 lux the sensor conductance is about 0.001 mho (1000 ohms). The mirror control circuit of FIG. 2 of U.S. Pat. No. 5,204,778 serves to hold the voltage V18 nearly constant at about three volts. As explained in the description in U.S. Pat. No. 5,204,778, for the mirror control function the resistor R209 serves primarily to limit current to sensor R243 under high light conditions when the resistance of R243 is low. For the night time light levels normally present when the dimming feature of the mirror is in operation, the resistance of R243 is very much higher than the resistance of R209 so that the voltage drop across R209 is low. In normal mirror control operation, the nearly constant voltage across sensor R243 causes the current i202 to vary in proportion the sensor conductance which in turn varies in approximate proportion to the light level which strikes the sensor. As explained in U.S. Pat. No. 5,204,778, the base to emitter voltage of transistor Q207 varies in logarithmic relationship to the current i202 and it is this voltage which is used by the control circuit to sense the magnitude of current I202 output by the sensor circuit and thereby to sense and respond to the light level impinging on R243.

At the higher light levels present when the ambient light level must be sensed by the headlamp control in order determine when to switch the headlamps from on to off or from off to on, the resistance of sensor R243 is in the neighborhood of 1000 ohms. This is about half the resistance of R209 which is 1800 ohms and the voltage V18 is maintained close to its three volt level so a signal level in the order of one volt is available at V1 when the ambient light level is in the general range of the threshold levels at which the headlamps are switched on and off. In the light level range where the headlamp on/off switching thresholds are placed the resistance of the sensor R243 is very much lower than the resistance of R248 so R248 has negligible effect on the circuit for the headlamp and running light function. With increasing ambient light level striking the sensor R243 its resistance decreases causing the voltage V1 to decrease. Resistors R1 and R2 form a divider and along with positive feedback resistor R3 establish a voltage V2 which serves as a reference against which the signal V1 which is indicative of the ambient light level is compared. The variable resistor R2 is adjusted to calibrate the switching threshold light level for the circuit. In full daylight, the ambient light level is above the switching threshold, so the resistance of R243 is low causing the voltage V1 to be below the level V2. This causes the output of operational amplifier U1 which is used as a comparator to be high which in turn causes current flowing through R3 to pull the voltage V2 to the higher of its two general operating levels. Toward dusk, the ambient light level falls causing the resistance of R243 to increase increasing the voltage V1 until it reaches and then exceeds the voltage V2 at which point the high gain amplifier U1 switches causing V3 to go low. This in turn causes current flowing through R3 to pull the voltage V2 to the lower of its two general operating levels. The light level must rise by roughly eighty percent from the lower light level threshold point before U1 switches V3 to its positive extreme indicating that the headlamps do not need to remain on. A decrease in the resistance of R3 relative to R1 increases the hysteresis. Relatively large hysteresis values may prove beneficial to reach a balance for the best operation with the shared sensor configuration.

For convenience the condition of higher ambient light level for which V3 is high and for which the headlamps are ultimately to be turned off will be referred to as the high ambient light condition. Likewise, the condition of lower ambient light for which V3 is low and for which the headlamps are ultimately to be turned on will be referred to as the low ambient light condition.

As explained above, delay arrangement is used to minimize unwanted switching between the on and off states of the headlamps. Control of the timing circuit for the various conditions centers around transistors Q1 and Q2 and their associated resistor networks. Operational amplifier U2 and integrating capacitor C2 respond to perform the timing function and amplifier U3 which is used as a comparator with positive feedback serves to detect the time-out conditions and to generate the signal V10 which ultimately causes the headlamps to be turned on or off. The voltage V10 at the output of U3 is high to turn the headlamps on and is low to turn the headlamps off. Under normal operating conditions the remainder of the control circuit responds directly and without substantial delay to the high or low state of V10 to keep the headlamps on or off, respectively.

For convenience in the discussion of timing which follows, the state of V10 will be referred to as the present headlamp state where the headlamps are presently on when V10 is high, and the headlamps are presently off when V10 is low. This statement is made with the understanding that some logic conditions in remaining portions of the circuit may override the headlamp state which is normally determined by V10.

As noted in the introductory section and in the objectives, a delay is introduced between the onset of a high or low ambient light condition and the resulting change of the present state of the headlamps to headlamps off or headlamps on, respectively. There are four possible combinations of the high/low ambient light condition and the present headlamp off/on state which determine control input to the delay circuit.

Under the two of the four possible combinations the delay period is increased rather rapidly toward its maximum. For these two combinations the ambient light condition agrees with the present state of the headlamps. These combinations are the ones for which the ambient light condition is low and the headlamps are presently on or for which the ambient light condition is high and the headlamps are presently off. For either of these two combinations, the timing capacitor is charged at a relatively rapid rate in a direction to require the maximum time delay in switching to the other headlamp state.

Under the other two of the four possible combinations the delay period is decreased rather slowly toward its time-out condition at which point the headlamps are switched to their alternate on/off state. For these two combinations the ambient light condition disagrees with the present state of the headlamps. These combinations are the ones for which the ambient light condition is low and the headlamps are presently off, or for which the ambient light condition is high and the headlamps are presently on. For either of these two combinations, the charge on the timing capacitor is changed at a relatively slow rate in a direction to reach the timeout condition where the headlamps are switched to their alternate state.

When the ambient light condition is low and the headlamps are on, V3 is low and V10 is high so that Q1 is turned on causing current to flow through the series combination of R10 and R4 and through the emitter and collector of Q1 and through R5 to ground. A smaller current also flows from Vc through R6 and through R5 to ground. The current in R5 raises the voltage V4 to approximately 0.57 volt. Without current from timing capacitor C2, V5 is about 0.14 volts due to current from V10 through R7. Resistor R11 is in the circuit to prevent current from the discharge of C2 from damaging the operational amplifier. Since very little current flows into any of the operational amplifier inputs when they are biased in a normal operating range, the voltage across R11 is close to zero so V5 nearly equals V6. The high gain of operational amplifier U2 causes its output voltage V7 to increase at a rate which maintains the current i1 at a level which causes the voltage V6 and, thus, V5 to nearly equal the voltage V4. As long as V3 is low and V10 is high, operation continues in the mode described until the voltage V7 increases to within about one volt of Vc at which point, the operational amplifier U2 reaches the limit in its ability to drive V7 higher and V7 is maintained at this output saturation voltage. This represents the maximum time delay which the circuit can command to delay turn off of the headlamps when the ambient light condition goes high. When the ambient light condition is low and the headlamps are on and with the circuit values listed, it takes approximately 2.2 seconds to increase the turn off delay from nearly zero to approximately 20 seconds. An increase in the series resistance of R10 and R4 increases the 2.2 second timing.

When the ambient light condition is high and the headlamps are on, V3 is high and V10 is also high so that Q1 is turned off preventing significant current flow through the series combination of R10 and R4. The smaller current still flows from Vc through R6 and through R5 to ground. The current in R5 raises the voltage V4 to approximately 0.073 volt. Without current from timing capacitor C2, V5 is about 0.127 volts due to current from V10 through R7 and R9. The high gain of operational amplifier U2 causes its output voltage V7 to decrease at a rate which maintains the current i1 at a level which causes the voltage V5 to nearly equal the voltage V4. As long as V3 and V10 are high, operation continues in the mode described until the voltage V7 decreases to about 0.87 volt at which point, the operational amplifier U3 switches low to turn the headlamps off. This is the sequence to turn the headlamps off after a delay when the ambient light condition goes high. When the ambient light condition is high and the headlamps are on and with the circuit values listed, depending on the remaining delay, it takes up to the maximum delay of approximately 20 seconds to turn the headlamps off. An increase in the resistance of R7 or a decrease in the resistance of R6 increases the 20 second timing.

When the ambient light condition is high and the headlamps are off, V3 is high and V10 is low so that Q2 is turned on causing current to flow through R8 and through the emitter and collector of Q2 and through R9 to ground. A smaller current also flows from the collector of Q2 through R7 to V10 which is close to ground. The current from Vc through R6 and R5 raises the voltage V4 to approximately 0.073 volt. Without current from timing capacitor C2, V5 is about 0.47 volts due to current from V3 through R8 and Q2 flowing into R9 and R7. The high gain of operational amplifier U2 causes its output voltage V7 to decrease at a rate which maintains the current i1 at a level which causes the voltage V5 to nearly equal the voltage V4. As long as V3 is high and V10 is low, operation continues in the mode described until the voltage V7 decreases to almost 0 volts at which point, the operational amplifier U2 reaches the limit in its ability to pull V7 lower and V7 is maintained at this output saturation voltage. The voltage V5 then places a small reverse charge on C2. The charging time constant in placing the small reverse charge on C2 after the operational amplifier reaches saturation is approximately that of C2 being charged by the parallel combination of R7 and R9. This gives a charging time constant of about one quarter of a second for the component values used. Thus, the capacitor is charged to within a very few percent of the value for which the turn on delay is a maximum within about one quarter of a second after the U2 saturates. This represents the maximum time delay which the circuit can command to delay turn on of the headlamps when the ambient light condition goes low. When the ambient light condition is high and the headlamps are off and with the circuit values listed, it takes approximately 2.4 seconds to increase the turn on delay from nearly zero to approximately 13 seconds. An increase in the resistance of R8 increases the 2.4 second timing.

When the ambient light condition is low and the headlamps are off, V3 is low and V10 is also low so that Q1 and Q2 are turned off turning off the current flow through the series combination of R10 and R4 and also through R8. The smaller current still flows from Vc through R7 and through R5 to ground. The current in R5 raises the voltage V4 to approximately 0.073 volt. Without current from timing capacitor C2, V5 is about 0 volts because in addition to Q2 being off, V10 is low so little current flows through R7. The high gain of operational amplifier U2 causes its output voltage V7 to increase at a rate which maintains the current i1 at a level which causes the voltage V5 to nearly equal the voltage V4. As long as V3 and V10 are low, operation continues in the mode described until the voltage V7 increases to about 3.3 volts at which point, the operational amplifier U3 switches high to turn the headlamps on. This is the sequence to turn the headlamps on after a delay when the ambient light condition goes low. When the ambient light condition is low and the headlamps are off and with the circuit values listed, depending on the remaining delay, it takes up to the maximum delay of approximately 13 seconds to turn the headlamps on. An increase in the resistance of R6 increases the 13 second timing.

Diodes D10 and D11 limit the reverse base to emitter voltage which may be applied to transistors Q1 and Q2. In the above adjustment of the relative values of R4, R10, R6, R7 and R8 gives a considerable degree of independence between the four separate timings. As indicated earlier, the times to increase the delay to switch to the alternate state are made far shorter than the delay times themselves. Furthermore, the delay in switching the headlamps from on to off is made longer than the delay to switch the headlamps from off to on. R5 and R9 are preferably sized to provide as high a voltages as possible without causing substantial base current to flow in Q1 and Q2 except when D1 conducts as will be explained below.

Figure 2:
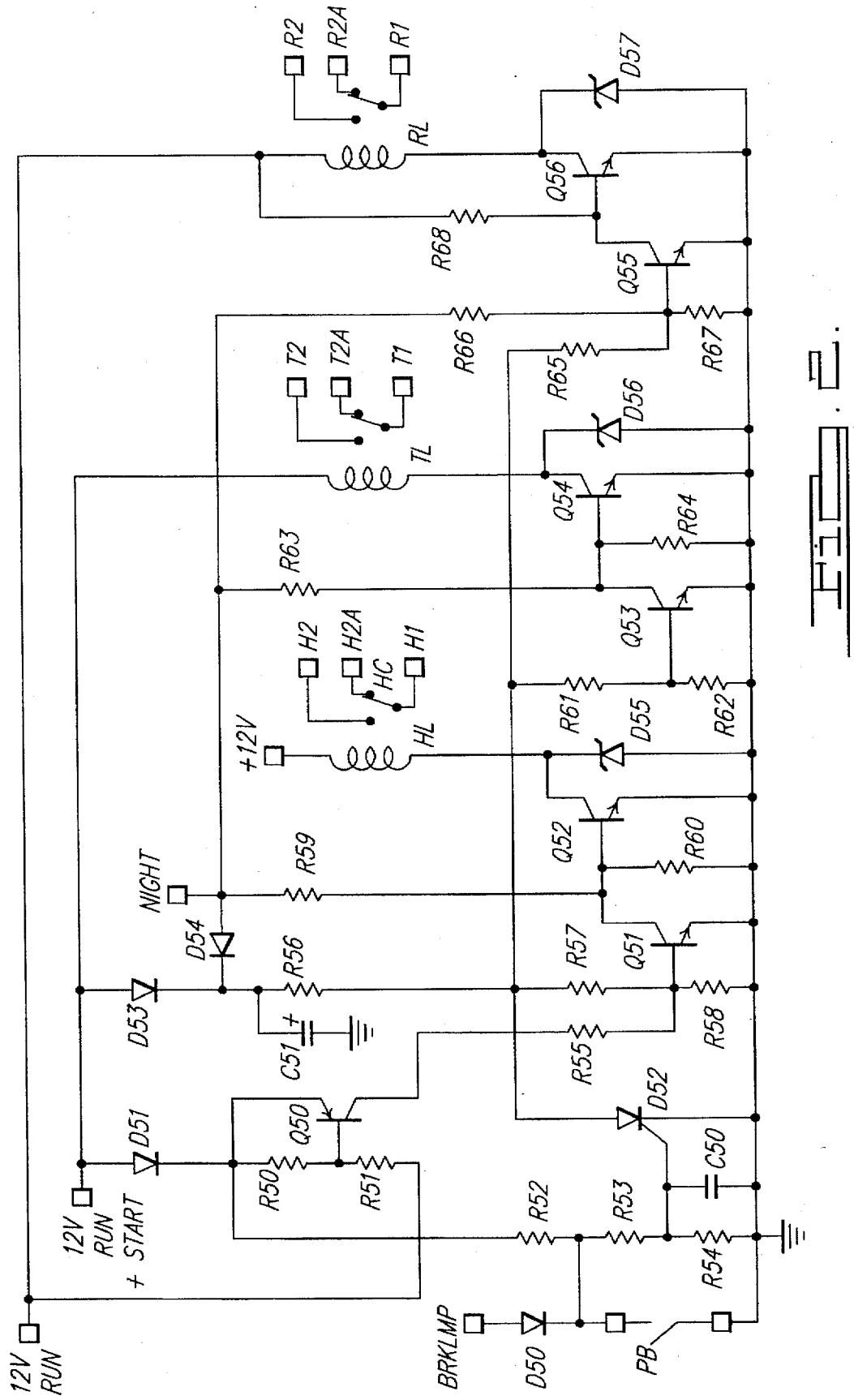
FIG. 2 is a circuit diagram of a headlamp control module which interconnects with the headlamp control shown in FIG. 1 ten witch power to the headlamps and to provide several added logic functions to the headlamp control system.

Operational amplifier U3 is used in a comparator mode with R13 and R14 providing a steady reference voltage V8 for the inverting input and the divider R12 and R15 providing positive feedback to provide a low and a high switching threshold for the input V7. When the headlamps are off, V10 is low and output V7 of the timing integrator must increase well above the voltage V8 before V9 exceeds V8 at which point the output V10 goes high to turn on the headlamps. V9 increases substantially and V7 must decrease substantially below V8 before V9 drops below V8 to cause V10 to go low to turn the headlamps off. When V10 goes low, the voltage V9 decreases substantially. The divider formed by R16 and R17 supplies base current to transistor Q4 to turn it on when V10 is high provided that transistor Q3 is not turned on. When turned on, Q3 draws current from the base of Q6 through resistor R21 and diode D2 turning it on. Turn on of Q6 pulls the NIGHT terminal high to signal the module whose circuit is shown in FIG. 2 to turn on the headlamps if no other signal inhibits their turn on. R30 prevents leakage or small noise generated currents from turning on Q6. D3 protects Q6 from reverse or over-voltage. The +12 V input is supplied even when the ignition is turned off. Thus when the headlamps are kept on by the exit delay feature, current from Q6 flows through diode D4 to provide power to keep supply voltage Vc high to supply the headlamp control and mirror control circuits until Q6 is turned off to turn off both the supply and the headlamps. Diode D2 prevents damage if a negative voltage is applied at the 12 V terminal. The 18 volt MOV protects portions of the circuit from over voltage transients and zener diode D3 protects Q6 from over or reverse voltage. R29 limits current in the event that the NIGHT terminal is shorted. Resistor R230A limits current to zener diode D211 which clamps the voltage Vc to 6.2 volts to provide a regulated supply voltage for the combined mirror and headlamp control circuits. D211 is 6.2 volts. Other voltages such as 6.8 volts may also be used depending on the specific combination of operating voltage and circuit voltage requirements for a particular application. Capacitors C1 C201, and C202 serve as bypass and filter capacitors for the Vc supply voltage.

The RC discharging time constant formed by the parallel combination of capacitor C3 with series resistors R28 and R29 serves to provide the exit delay timing which is used to hold the headlamps on while the driver exits the vehicle. R29 has an adjustment knob or slider which the driver may move to select the desired delay time. The minimum time is determined by C3 and R28 when the resistance of R29 is set to zero. The maximum time is provided when R29 is set to its maximum resistance. The delays range from a minimum of several seconds to a maximum of several minutes. The resistance or capacitance values may be adjusted to provide different delays. The resistance of R28 must be high enough to assure that when R29 is set to zero, V12 still exceeds V13 when power is supplied at the 12 V RUN+START input so that the headlamps can be turned on. When the ignition has been in the "off" position for a substantial period of time, the NIGHT signal will be at zero volts as will the 12 V RUN+START input. The voltages on capacitors C2 and C3 will also be close to zero volts. When power is supplied at the 12 V RUN+START input, current is supplied through D220, R23 and D12 to charge C3. When V19 exceeds the voltage Vc by more than about 0.7 volts, D13 conducts to clamp V19 at that voltage. The voltage V13 is determined by V14, Vc, and R25, R26, and positive feedback resistor R27. Initially with C3 discharged, V13 is higher than V12 so the output V14 of operational amplifier U4 is high. Current from V14 flows through R19 turning on Q3 assuring that Q4 is turned off and that Q6 is turned off assuring that NIGHT is not pulled high so the headlamps are not turned on. When the ignition is turned on while the ambient light level is low, V3 is or quickly goes low and current from V14 flows through D1 supplying current through R4 and the emitter to base of transistor Q1 turning it on to a saturated state and supplying enough current to the output of U1 through the base of Q1 to raise V3 to about 0.5 volts. V4 is raised to a little over one volt causing U2 to supply a relatively high integrating current i1 to raise the voltage V5 to match V4. The voltage V7 increases rapidly to turn on the headlamps. When the ignition is turned on while the ambient light level is high, V3 goes high almost immediately so that D1 is not biased into conduction. Instead, Q2 is turned on and the charge on C2 is driven slightly negative as described for the case where the ambient light condition is high and the headlamps are off. Nominally, it takes a little over a second for C3 to charge to the point that V12 exceeds V13 and V14 goes low which is the normal operating state. With V14 low, Q3 is turned off so it does not disable turn on of the NIGHT output and D1 is not biased into conduction for any of the ambient light conditions. To summarize the above, the exit delay timing capacitor and its associated circuit has been used for the second function which is to prevent turn on of the headlamps and using D1 to enable a quick change of the charge on C1 to the headlamp on condition when the ignition is turned on and the headlamps are needed. When the headlamps are not needed, the charge on C2 is normally in the range for headlamps off at power up and it is allowed to operate normally and stay in this condition when the headlamps are not needed when the ignition is turned on.

During operation, C3 is charged and V12 remains high. When the ignition is turned off, the voltage at the 12 V RUN+START input goes low reverse biasing D220, D12, and D13 and allowing C3 to discharge through series connected resistors R28 and R29. With V14 low, if NIGHT is also low, power is removed from the circuit and nothing further happens except that C2 and C3 discharge while the ignition is off. When the ignition is turned off, if the headlamps are turned on by the NIGHT signal being pulled high, current is supplied through D4 to and R30A to maintain Vc which in turn maintains the NIGHT high until either timing capacitor C3 discharges to the point where V12 goes below V13 and V14 goes high turning on Q3 and turning off Q4 and Q6 or V10 goes low in response to a high ambient light condition also turning off Q4 and Q6. In either event, the headlamps are turned off and current is no longer supplied through D4 to energize the circuit so the circuit is de-energized until the next time that the ignition is turned on to supply voltage at the 12 V RUN+START input.

The circuit for the headlamp switching module is shown in FIG. 2. This module is normally mounted under the dash of the vehicle and receives power from the +12 V terminal continuously and from the 12 V RUN terminal when the ignition switch is in the "run" position and from the 12 V RUN+START terminal which is energized when the ignition switch is in either the "run" or the "start" positions. A switch PB is also attached to the module and is closed when the parking brake is engaged. A terminal BRKLMP is isolated from the remaining circuit by diode D50 and switches on a warning lamp when the brake is set. The module includes a feature to energize daytime running lights, and a feature required by one automotive manufacturer to prevent the automatic turn on of any lights while the parking brake remains set when the parking brake was set before the ignition switch was turned on. SCR D52 is used as a latch which is triggered any time that the ignition is in the "run" or the "start" positions and the parking brake is off. D52 then latches and continues to conduct enabling automatic turn on of lighting functions until the current latching D52 in conduction is interrupted when the ignition switch is turned off and the headlamps have also completed a normal exit delay cycle. The feature is required to make it possible to turn the ignition switch on in the course of servicing the vehicle without turning on the vehicle's lights.

Three relays are used. The relay HL is energized to effect automatic turn on of the headlamps. Its contacts attached to terminals H1, H2, and H2A are configured in a headlamp control circuit with the dimmer switch 511 and manual control switch to turn the headlamps 507 on when the HL relay is energized. The TL relay is energized to turn on the tail lamps and the marker lamps. The contacts attached to terminals T1, T2, and T2A are used to switch the tail lamps and marker lamps on when the TL relay is energized. The RL relay is energized to turn on the vehicle daytime running lamps. The contacts attached to terminals R1, R2, and R2A are used to switch the daytime running lamps on when the RL relay is energized.

The NIGHT terminal of FIG. 2 is attached to the corresponding NIGHT terminal of FIG. 1. When the circuit of FIG. 1 pulls the NIGHT line high current is supplied to parts of the circuit through D54, R59, R63, and R66. The current through D54 maintains C51 in the charged state after the ignition is turned off and current is no longer supplied to C51 through D53 from the 12 V RUN+START line. This maintains current in SCR D51 which maintains it in its turned on state when it has already been turned on. When SCR D52 is turned on, current is not supplied through R57 to turn on Q51, or through R61 to turn on Q53, or through R65 to turn on Q55. This is the normal operating configuration. With SCR D52 turned on, so Q51 and Q53 are turned off, the current supplied by the high NIGHT signal turns on Q52 which energizes the HL relay, turns on Q54 which energizes the TL relay, and turns on Q55 which shorts the base to emitter of Q56 assuring that it is turned off so that the RL relay is not energized. When the NIGHT input is not pulled high, base current is not fed to Q52 or Q54 assuring that they are turned off and that the HL and the TL relays are not energized. With NIGHT low and with the 12 V RUN and 12

V RUN+START inputs high and with SCR D52 turned on neither R65 or R66 supply current to turn on Q55 and the 12 V RUN input supplies both the positive supply to the RL relay and the base of Q56 through R68 to turn Q56 on and energize the RL relay to turn on the daytime running lamps.

With the 12 V RUN+START input or the NIGHT input high and with D52 turned off current through R57, R61, and R65 turns on Q51, Q53, and Q55, respectively, which assures that Q52, Q54, and Q56, respectively, remain of so that none of the relays are turned on so that none of the lamps are turned on by the automatic functions provided by the module.

Capacitor C50 prevents noise pulses from triggering SCR D52. R50, R54, R58, R60, R62, R64, and R67 prevent small currents such as those present due to the anode to cathode voltage of D52 when it is turned on from turning on the respective semiconductor to which they connect. Current through D51, R50, and R51 triggers SCR D52 causing it to turn on when the 12 V RUN+START input is high and the parking brake PB contact is open indicating that the parking brake is not engaged. When the PB contact is closed D52 will not be triggered but if previously triggered will continue to conduct until its current supply is interrupted by having both the 12 V RUN+START input and the NIGHT input go low.

While holding the ignition in the "start" position, it is not desirable to draw current from energized headlamps but it is necessary to leave the tail lamps on under conditions where they are normally required. Under the above condition, the 12 V RUN+START input remains high and the 12 V RUN input goes low turning on transistor Q50 with current supplied from D51 and flowing through R51 to the 12 V RUN input. Q50 then supplies current through R55 to turn on transistor Q51 which diverts current from the base of transistor Q52 holding it off and assuring that the headlamps are not turned on while the vehicle is being started. The daytime running lamps are also held off because they are supplied from the 12 V RUN input which is low during starting. The tail lamps are turned on if NIGHT is high. Zener diodes D55, D56, and D57 conduct to protect transistors Q52, Q54 and Q56, respectively, from either over voltage transients or from reverse voltage transients or fault conditions.

Figure 3:
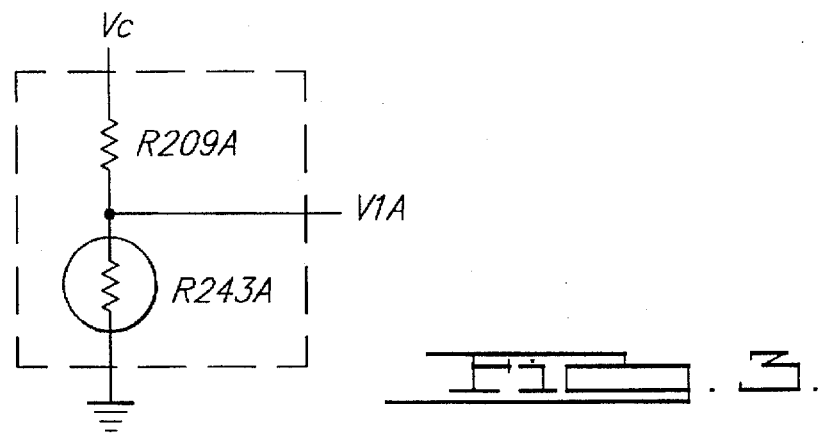
FIG. 3 is an alternate ambient light sensor configuration.

In configurations where the automatic mirror is not supplied, the sensor configuration of FIG. 3 may be substituted for the shared sensor configuration shown enclosed in the dashed rectangle of FIG. 1. Here the value of R209A may be increased by about two times over that of resistor R209 to partially compensate for the higher voltage at Vc than at V18. Adjustments may also be made in the value of R3 to obtain the exact hysteresis which is desired.

It should be noted that display functions which are built into the mirror may directly utilize the NIGHT signal to control their illumination or brightness thereby eliminating the need for a separate signal which indicates that the headlamps are on which is often routed to display devices in the vehicle to effect adjustments in display brightness.

In FIG. 4 an ambient light sensor is configured for shared use in a system which incorporates one or more micro controllers and which may include a digital communication bus. The ambient light sensor 100 may be configured much as shown in FIG. 3. The ambient light signal may be fed directly to mirror control (alternate 1) 101 and also to analog to digital converter 102 to be made available on a communication bus by the digital bus communication interface 103. Various units may then access the ambient light signal and utilize it for various control functions. For example, mirror control (alternate 2) 104 may utilize a microcontroller which may access the ambient light reading from the bus. The headlamp control 105, the climate control 106, and the lighting control 107 may similarly access the ambient light reading each utilizing it in a specialized way for a specialized control function. It is also possible to combine one or more of these functional packages into one control module.

With the inclusion of intensity controls to run the headlamps at reduced intensity for the daytime running lamp function, the possibility is raised to not only turn the headlamps on and off but also to control the intensity of the headlamps a function of the ambient light level and of their high and low beam condition. It should be understood that extensions of the shared ambient light sensor to such systems is in the scope of this invention.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A controller for a vehicle headlamp system comprising an ambient light sensor providing an ambient light level signal indicative of the ambient light level, a dual slew rate capacitor timer for increasing or decreasing a delay time period for switching the headlamp operating state in accordance with the ambient light level signal and a headlamp operating state signal, the capacitor timer including a circuit for increasing the delay time period at a first rate of change and decreasing the delay time period at a second rate of change wherein the first rate of change is greater than the second rate of change, an analog signal comparator responsive to the capacitor timer for switching the headlamp operating state after the delay time period has elapsed, the dual slew rate capacitor timer including an integrating operational amplifier having a variable input resistance network connected to at least one input terminal of the integrating operational amplifier, a capacitor connected between an inverting input terminal and an output terminal of the integrating operational amplifier, a shared timing capacitor for energizing the headlamp approximately one second after a vehicle ignition switch is turned to a "run" position when the ambient light level is below a predetermined low ambient light threshold, said shared capacitor timer including a variable delay exit circuit for controlling an exit delay time period during which the headlamp operating in an energized state remains energized after the vehicle ignition has been turned off.

2. A controller for a vehicle headlamp system including a pair of headlamps, said system comprising an ambient light sensor providing an ambient light level signal indicative of the ambient light level, a dual slew rate capacitor timer for increasing or decreasing a delay time period for switching the headlamp operating state in accordance with the ambient light level signal and a headlamp operating state signal, the capacitor timer including a circuit for increasing the delay time period at a first rate of change and decreasing the delay time period at a second rate of change wherein the first rate of change is greater than the second rate of change, an analog signal comparator responsive to the capacitor timer for switching the headlamp operating state after the delay time period has elapsed, and a shared capacitor timer responsive to both a vehicle ignition switch and a user operated exit delay adjustment device for energizing said pair of headlamps when the ignition switch is turned to an "on" position and the ambient light level is below a predetermined low ambient light threshold, and for maintaining said headlamps in an energized state for a predetermined time period after the ignition switch is turned to an "off" position.

3. A headlamp and automatic mirror control system for a vehicle having a headlamp and an automatically dimming rearview mirror, said control system comprising, in combination, ambient light sensing means for determining the ambient light level, first control means for selecting an energized or deenergized state of said headlamp as a function of the ambient light level as determined by said ambient light sensing means, second control means for determining an operating threshold of said automatically dimming rearview mirror as a function of the ambient light level as determined by said ambient light sensing means, and switching means operable to energize and deenergize said headlamp in response to said first control means, said first control means including ambient light threshold detection means effective to output a first signal state indicative of a high ambient light level sensed by said ambient light sensing means and a second signal state indicative of a low ambient light level sensed by said ambient light sensing means, said first control means further including delay timing control means providing an output signal responsive to said first and second signal states, said delay timing control means also being responsive to a third signal indicative of the energized or deenergized state of said vehicle headlamp, said output signal being indicative of the energized or deenergized state of said headlamp as compared with the ambient light level, said delay timing control means including means for increasing a delayed time period for changing the energized or deenergized state of said headlamp when the energized state of said headlamp conforms with said first signal state indicative of a high ambient light level, and also includes means for decreasing the delay time period for switching the energized state of said headlamp to a deenergized state of said headlamp when the second signal state is indicative of a low ambient light level, said switching means including means responsive to a timing threshold detection means for selectively controlling the intensity of light emitted by said headlamp, when emitting a low intensity light level functioning as a daytime running lamp.

4. The control system as set forth in claim 3, with said vehicle including a tail lamp, said switching means including means responsive to said timing threshold detection means for selectively energizing and deenergizing said tail lamp.

5. The control system as set forth in claim 4, with said switching means including means responsive to said timing threshold detection means for selectively energizing and deenergizing said vehicle headlamp, and means responsive to said timing threshold detection means for selectively energizing and deenergizing said tail lamp.

6. A headlamp and automatic mirror control system for a vehicle having a headlamp and an automatically dimming rearview mirror, said control system comprising, in combination, ambient light sensing means for determining the ambient light level, first control means for selecting an energized or deenergized state of said headlamp as a function of the ambient light level as determined by said ambient light sensing means, second control means for determining an operating threshold of said automatically dimming rearview mirror as a function of the ambient light level as determined by said ambient light sensing means, and switching means operable to energize and deenergize said headlamp in response to said first control means, said first control means including ambient light threshold detection means effective to output a first signal state indicative of a high ambient light level sensed by said ambient light sensing means and a second signal state indicative of a low ambient light level sensed by said ambient light sensing means, said first control means further including delay timing control means providing an output signal responsive to said first and second signal states, said delay timing control means also being responsive to a third signal indicative of the energized or deenergized state of said vehicle headlamp, said output signal being indicative for of the energized or deenergized state of said headlamp as compared with the ambient light level, said delay timing control means including means effective to increase the time delay period for switching the headlamp energized or deenergized state in which said headlamp is energized at a high light emitting intensity and the ambient light level is below a low ambient light threshold, and when the headlamp is operating at a low intensity light emitting state and the ambient level is above a high ambient light threshold, and wherein said delay timing control means also includes means for decreasing the delay time period required to switch the headlamp from the high intensity light emitting state and the ambient light level is above the high ambient light threshold, and when the headlamp is operating in the low intensity light emitting state and the ambient light level is below the low ambient light threshold.

7. A headlamp and automatic mirror control system for a vehicle having a headlamp and an automatically dimming rearview mirror, said control system comprising, in combination, ambient light sensing means for determining the ambient light level, first control means for selecting an energized or deenergized state of said headlamp as a function of the ambient light level as determined by said ambient light sensing means, second control means for determining an operating threshold of said automatically dimming rearview mirror as a function of the ambient light level as determined by said ambient light sensing means, and switching means operable to energize and deenergize said headlamp in response to said first control means, said vehicle including an ignition switch, said control system including an exit delay manually adjustable means for selectively manually adjusting an exit delay time period during which said headlamp is maintained in an energized state after said ignition switch is opened.

8. The control system as set forth in claim 7, with said first control means including means responsive to said exit delay adjustment means for deenergizing said headlamp and for deenergizing said first control means after expiration of the exit delay time period, said first control means being deenergized to prevent power consumption when said headlamp is deenergized and said ignition switch is opened.

9. A headlamp and automatic mirror control system for a vehicle having a headlamp and an automatically dimming rearview mirror, said control system comprising, in combination, ambient light sensing means for determining the ambient light level, first control means for selecting an energized or deenergized state of said headlamp as a function of the ambient light level as determined by said ambient light sensing means, second control means for determining an operating threshold of said automatically dimming rearview mirror as a function of the ambient light level as determined by said ambient light sensing means, and switching means operable to energize and deenergize said headlamp in response to said first control means, said control system including a digital communication bus, digital bus communication interface means effective to feed the output from said ambient light sensing means to said digital communication bus, and an analog to digital conversion means connecting the output of said ambient light sensing means to said interface means, at least one of said first and second control means being connected to said digital communication bus, said vehicle including an ignition switch, said control system including an exit delay manually adjustable means for selectively manually adjusting an exit delay time period during which said headlamp is maintained in an energized state after said ignition switch is opened.

* * * * *